Feb. 20, 1968   C. L. HEADLEY   3,369,275
COTTON GIN RIB
Filed April 19, 1965
FIG. 2
FIG. 1
FIG. 3
FIG. 4
FIG. 5
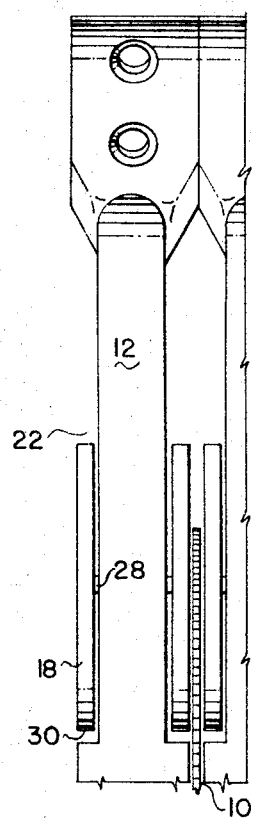
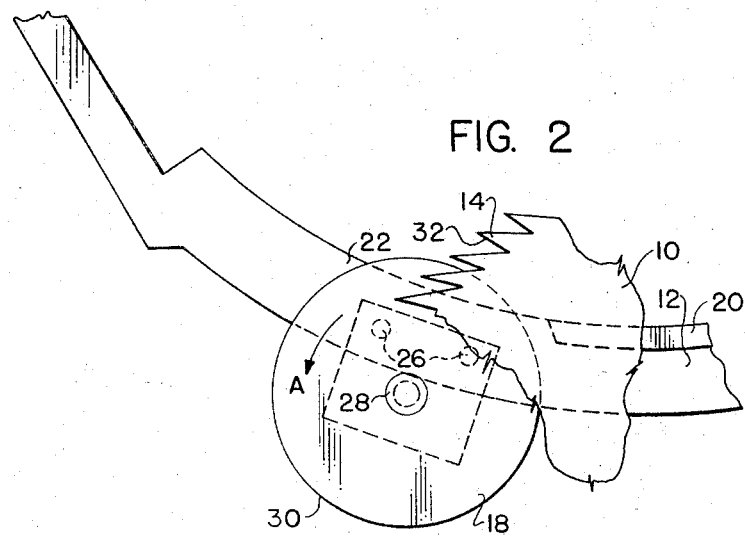
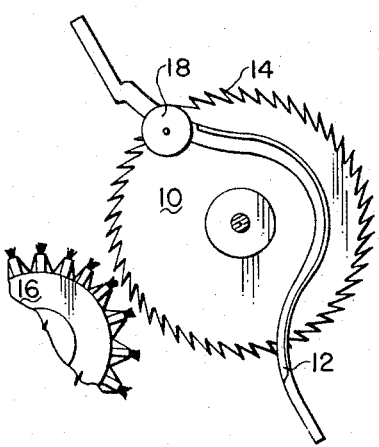
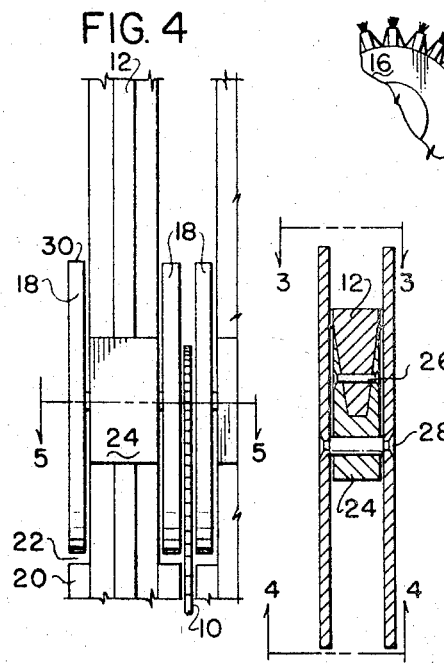
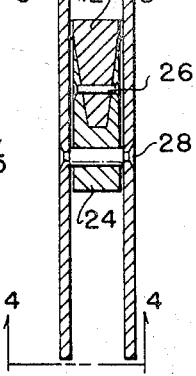
CHARLES L. HEADLEY
INVENTOR.
BY

United States Patent Office 3,369,275
Patented Feb. 20, 1968

3,369,275
COTTON GIN RIB
Charles L. Headley, Lubbock, Tex., assignor of two-thirds to James E. Nayfa, Dallas, Tex.
Filed Apr. 19, 1965, Ser. No. 449,165
3 Claims. (Cl. 19—62)

ABSTRACT OF THE DISCLOSURE

Rollers are attached to cotton gin ribs at the ginning point. The center of the roller is within the circle of the saw so that the leading edge of each saw tooth is parallel to the periphery of the roller when the tooth passes the roller.

---

This invention relates to cotton gins and more particularly to a cotton gin rib with a roller mounted thereon at the ginning point.

Commercially cotton is ginned by snagging locks of cotton upon the teeth of rotating saws and pulling the lint between ribs of the saw while preventing the seed from passing between the ribs.

According to this invention a roller is mounted upon the rib so that the locks of cotton upon the teeth contact the peripheral cylindrical face of a roller mounted on the rib instead of contacting the stationary rib surfaces. As the cotton contacts the roller and passes between adjacent rollers the friction of the cotton on the roller will rotate the roller. The fibers of the lint will move away from the saw so there is less thickness of material passing between adjacent rollers than if the fibers of the lint trailed along the teeth. In addition the tooth has a better action of removing the seed as the tooth passes along the roller.

It is recognized in the normal operation of a cotton gin that it is necessary to "brake" or provide a friction area in the seed roll box to slow the seed roll down so that as the saw passes through the seed roll each tot tooth picks up a tuft of cotton lint. Previously this braking action has been before the saw contacts the seed roll. According to my invention the roller provides an irregularity on the face of the rib which causes the roll to "brake" afterwards, which is advantageous.

An object of this invention is to gin cotton.

Another object is to provide a roller on the gin rib at the ginning point.

Another object is to gin cotton with no damage to the fiber or the seed.

A further object is to gin cotton faster.

A further object is to provide a gin rib which will "brake" the seed roll at the ginning point.

A further object is to move the tuft of cotton on each tooth away from the perimeter of the saw so that there is less congestion caused otherwise by the build up of two tufts together with the thickness of the saw as the saw passes between the ribs.

Still further objects are to achieve the above with a device that is sturdy, compact, durable, simple, reliable, yet inexpensive and easy to manufacture and operate.

Still further objects are to achieve the above with a method that is rapid, inexpensive and does not require skilled people to operate.

The specific mature of the invention as well as other objects, uses and advantages thereof will clearly appear from the following description and from the accompanying drawing, the different views of which are not necessarily to the same scale, in which:

FIG. 1 is a fragmental sectional view showing gin saw and doffing brush with an improved rib according to this invention.

FIG. 2 is an enlarged partial view of the elements of the saw, roller, and rib as shown in FIG. 1.

FIG. 3 is a front partial elevational view of a rib and a portion of an adjacent rib with rollers as seen from line 3—3 of FIG. 5.

FIG. 4 is a back elevational view of a rib and a portion of an adjacent rib with rollers as seen from line 4—4 of FIG. 5.

FIG. 5 is a sectional view taken on line 5—5 of FIG. 4.

Referring more particularly to the drawings it may be seen there represented a conventional gin saw 10 adapted to operate through rib 12 to remove the lint from the seed and carry the lint on to where it is doffed from the teeth 14 of the saw by the brush 16. Inasmuch as gin stands have been known and commercially available on the market for many years, the entire gin stand showing the seed roll box and other associated equipment has not been illustrated inasmuch as this invention is concerned only with roller or disc 18 upon the rib 12.

At the top area of the rib 12 (where the ginning point is) the edges of flange 20 of the rib is removed forming notch 22 on each side of the rib. Block 24 is attached to the bottom of the rib below the notch by rivets 26. Pin 28 is journalled for rotation in said block 24 with the axis of the pin 28 parallel with the axis of rotation of the gin saw 10. Inasmuch as the pin 28 is journalled beneath the rib 12, the center of rotation of the axis of the pin 28 and thus the roller or disc 18 is within the circle of the saw 10. Stated otherwise, if the pin 28 were extended it would contact the saw on either side thereof. A roller 18 is attached by riveting to each end of pin 28.

As may be seen, the axis of the saw 10 is outside the circle of the roller 18.

The ginning point or the point of the teeth 14 of the saw 10 pass the peripheral surface 30 of the roller 18 forms a very slight angle with the old ginning point on the rib itself. I.e. the point of contact of the fibers of cotton snagged upon the teeth 14 of the saw 10 has approximately the same relationship to the roller 18 as to the ginning point of the rib 12 before modification. Therefore the ginning action as the cotton contacts the peripheral cylindrical surface 30 of the roller 18 is basically the sames as with the stationary rib. However, in operation the friction of the cotton will cause the roller 18 to rotate in the direction of Arrow A. This rotation will carry the tufts of lint away from the saw 10. If the tufts of lint extend along the teeth 14 of the saw, the tufts of lint on one tooth will overlap the tufts of lint on the next tooth causing a thick wad of material to pass between the saw and the adjacent ribs 12. It is necessary that the clearance between adjacent ribs 12 be maintained small to prevent seed from passing therebetween, this being the basic principal of the cotton gin. However, the roller carries the ends of the tufts of lint away from the following tooth. There is a reduction of the thick wad of material which must pass between the saw 10 and the rib 12. Therefor all of the tufts of fibers of a lock of cotton that are engaged by each of the teeth 14 will pass between the ribs 12 thus resulting in more cotton being pulled through the ribs 12 with each tooth. This increased cotton passing through the ribs means that more cotton is ginned per unit time. Stated otherwise: my invention results in faster ginning.

Concerning details of construction I have had good success using a roller of two inches in diameter and about $3/32$ inch thick constructed of aluminum. The roller 18 is in the form of a flat disc with a cylindrical peripheral face 30. The center hole through the disc is drilled and bevelled on the outer face. Pin 28 is constructed of mild steel with a small spindle on each end which is riveted to fill the bevel on the outside of each disc. I have found that the use of the combination of aluminum and mild steel operates well.

Although this invention has been described as a modification of an existing rib it will be apparent to those skilled in the art that a special support could be made with the block 24 integral therewith. Also inasmuch as the ginning occurs against the face of the roller 18, it would not be essential for the rib 12 to have the traditional shape as illustrated but this could be varied for a rib particularly built for the use of the roller 18, however, for convenience the invention has been illustrated with a conventional rib modified to use the roller 18.

Again it is emphasized that for correct ginning there is a definite relationship between the angle of the leading edge 32 of each of the teeth 14 and the periphery 30 of the roller 18. This angle requires the center of the roller 18 to be within the circle of the saw 10. For this reason a continuous shaft connecting all of the rollers 18 is impossible.

It will be apparent that the embodiment shown is only exemplary and that various modifications can be made in construction, materials, and arrangement within the scope of the invention as defined in the appended claims.

I claim as my invention:

1. In a cotton gin having:
   (a) ribs,
   (b) a circular saw with
   (c) teeth along the periphery thereof
   (d) extending between the ribs, and
   (e) means operatively associated with the saw for doffing lint therefrom,
the improvement comprising in combination with the above:
   (f) a roller attached for rotation to the ribs,
   (g) the distance from the center of the saw to the center of the roller being less than the radius of the saw.

2. In a cotton gin having:
   (a) a circular saw
   (b) mounted for rotation about an axis with
   (c) teeth along the periphery thereof, and
   (d) means operatively associated with the saw for doffing lint therefrom,
the improvement comprising in combination with the above:
   (e) supports extending on either side of the saw,
   (f) rollers mounted for rotation about an axis on the supports,
   (g) the axis of the rollers parallel to the axis of the saw,
   (h) the distance between the axes being less than the radius of the saw,
   (j) the axis of the roller being within the circle of the saw, and
   (k) the axis of the saw being outside the circle of the roller.

3. In a cotton gin having:
   (a) a circuar saw
   (b) mounted for rotation about an axis with
   (c) teeth along the periphery thereof, and
   (d) means operatively associated with the saw for doffing lint therefrom,
the improvement comprising in combination with the above:
   (e) supports extending on either side of the saw,
   (f) rollers mounted for rotation about an axis on the supports,
   (g) the axis of the rollers parallel to the axis of the saw, and
   (h) the rollers attached to one support rotated solely responsive to friction from lint on the saw, and
   (j) said rollers rotating in the same direction as the saw.

References Cited

UNITED STATES PATENTS

| | | | |
|---|---|---|---|
| 1,151,565 | 8/1915 | Carmouche | 19—62 |
| 351,401 | 10/1886 | Ralston | 19—62 |

MERVIN STEIN, *Primary Examiner.*

I. C. WADDEY, *Assistant Examiner.*